United States Patent
Gouget et al.

(10) Patent No.: US 11,159,319 B2
(45) Date of Patent: Oct. 26, 2021

(54) SECURE ELECTRONIC DEVICE WITH MECHANISM TO PROVIDE UNLINKABLE ATTRIBUTE ASSERTION VERIFIABLE BY A SERVICE PROVIDER

(71) Applicant: GEMALTO SA, Meudon (FR)

(72) Inventors: Aline Gouget, Meudon (FR); Mariya Georgieva, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 480 days.

(21) Appl. No.: 16/060,977

(22) PCT Filed: Dec. 9, 2016

(86) PCT No.: PCT/EP2016/080518
§ 371 (c)(1),
(2) Date: Jun. 11, 2018

(87) PCT Pub. No.: WO2017/098019
PCT Pub. Date: Jun. 15, 2017

(65) Prior Publication Data
US 2018/0367305 A1 Dec. 20, 2018

(30) Foreign Application Priority Data
Dec. 11, 2015 (EP) .................................... 15306991

(51) Int. Cl.
*H04L 9/30* (2006.01)
*G07C 13/00* (2006.01)
*H04L 9/32* (2006.01)

(52) U.S. Cl.
CPC ............ *H04L 9/3073* (2013.01); *G07C 13/00* (2013.01); *H04L 9/3221* (2013.01);
(Continued)

(58) Field of Classification Search
CPC ...................................................... H04L 9/3073
(Continued)

(56) References Cited

U.S. PATENT DOCUMENTS

| 9,401,811 | B2 * | 7/2016 | Asim | H04L 9/3247 |
| 2010/0174911 | A1 * | 7/2010 | Isshiki | G06F 21/31 713/182 |

(Continued)

OTHER PUBLICATIONS

Guo, Nan, et al. "Aggregate signature-based efficient attributes proof with pairing-based anonymous credential." 2013 16th International Conference on Network-Based Information Systems. IEEE, 2013.*

(Continued)

*Primary Examiner* — Harris C Wang
(74) *Attorney, Agent, or Firm* — The Jansson Firm; Pehr B. Jansson

(57) ABSTRACT

A method for operating an attribute assertion device having a processor and memory to create an unlinkable digital signature-equivalent of an assertion message that is verifiable—by a service provider receiving the unlinkable digital signature-equivalent—as being generated from a digital signature of a known attribute provider having a public key $PK_{AP}$. Operating the processor of the attribute assertion device to transform a digital signature of the attribute message into an unlinkable digital signature-equivalent using a one-way transformation of the signature, with the transformation process using a random value generated by the attribute assertion device and a challenge provided by the service provider.

17 Claims, 8 Drawing Sheets

(52) U.S. Cl.
CPC ........ *H04L 9/3247* (2013.01); *H04L 2209/42* (2013.01); *H04L 2209/463* (2013.01)

(58) Field of Classification Search
USPC ........................................................ 713/170
See application file for complete search history.

(56) References Cited

U.S. PATENT DOCUMENTS

| | | | |
|---|---|---|---|
| 2011/0013771 A1* | 1/2011 | Camenisch | H04L 9/3252 380/46 |
| 2012/0159148 A1 | 6/2012 | Behren et al. | |
| 2014/0040622 A1 | 2/2014 | Kendall et al. | |
| 2014/0281491 A1* | 9/2014 | Zaverucha | H04L 63/0421 713/155 |
| 2018/0367305 A1* | 12/2018 | Gouget | H04L 9/3221 |

OTHER PUBLICATIONS

Guo Nan, et al: "Random orable-based anonymous credential system for efficient attributes proof on smart devices", Soft Computing, Springer Verlag, Berlin, DE, vol. 20, No. 5, May 22, 2015, pp. 1781-1791, XP035806183, ISSN: 1432-7643, DOI: 10.1007/S00500-015-1704-7 [retrieved on May 22, 2015] see sections 4 and 5.

Abhilasha Bhargav-Spantzel et al: "Multifactor Identity Verification Using Aggregated Proof of Knowledge", IEEE Transactions on Systems, Man, and Cybernetics: Part C:Applications and Reviews, IEEE Service Center, Piscataway, NJ, US, vol. 40, No. 4, Jul. 1, 2010, pp. 372-383, XP011346104, ISSN: 1094-6977, DOI: 10.1109/TSMCC. 2010.2045755 sections III and IV.

PCT/EP2016/080518, International Search Report, dated Feb. 2, 2017, European Patent Office, P.B. 5818 Patentlaan 2 NL—2280 HV Rijswijk.

PCT/EP2016/080518, Written Opinion of the International Searching Authority, dated Feb. 2, 2017, European Patent Office, D-80298 Munich.

PCT/EP2016/080527, International Search Report, dated Mar. 23, 2017, European Patent Office, P.B. 5818 Patentlaan 2 NL—2280 HV Rijswijk.

PCT/EP2016/080527, Written Opinion of the International Searching Authority, dated Mar. 23, 2017, European Patent Office, P.B. 5818 Patentlaan 2 NL—2280 HV Rijswijk.

* cited by examiner

SECURE ELECTRONIC DEVICE WITH MECHANISM TO PROVIDE UNLINKABLE ATTRIBUTE ASSERTION VERIFIABLE BY A SERVICE PROVIDER

BACKGROUND OF THE INVENTION

The present invention relates generally to verification of attribute assertions, and more particularly to secure electronic devices with mechanisms for providing an unlinkable attribute assertion that is verifiable as having been provided by an certified trusted attribute provider.

Many activities that humanity has carried out for centuries, if not millennia, can in modern times be performed online over the Internet. Online banking, commerce, auctions, etc. are more-and-more prevalent. In many cases the power of the Internet is both a convenience and a risk.

As an example, voting, whether in public elections or in the context of organizations and corporations, is one example of such a transformation from paper to electronic protocols. Elections have traditionally been carried out using paper ballots and mechanical voting machines. However, the Internet has brought with it an interest in providing for online elections in which voters may cast their votes using web-browsers, thereby allowing voters the convenience of voting from their homes and offices. Attempts to design such a system have addressed maintaining that convenience while also addressing security, transparency, and fairness concerns.

A goal for electronic voting is to provide the possibility for voting to occur in places other than at designated voting locations, e.g., at the home or office of a voter or any other location. An electronic voting mechanism is dependent on two conflicting requirements: the anonymity of the voter and verifiability by the election authority that the voter satisfies voter eligibility criteria. If the voter were to simply state his or her name to the election authority, anonymity would be vulnerable. Conversely, if the voter merely states that he or she is a law-abiding adult citizen of the voting jurisdiction, the election authority cannot simply take the voter's word for that or election fraud would be trivial.

Before discussing problems with digital attribute assertion systems, let's consider some terminology that is used throughout this document:

An attribute is some property associated with an entity, e.g., an individual. Good examples of attributes include age, citizenship, organization membership, criminal record, sex, and civil status.

An attribute message is a digital message sent from one entity to another to demonstrate that the sending entity has the associated attribute, e.g., "I am a citizen of the Republic of Atlantis" or "I have registered and been determined eligible to vote in the 2016 Presidential Election." Naturally, these messages would be digitally encoded in a manner known to both sender and recipient.

An attribute provider is an entity that may provide a certified, e.g., digitally signed, attribute message.

An attribute asserter is the entity, e.g., an individual, asserting that he or she possesses the attribute, e.g., by sending an attribute message to a service provider needing to verify the possession of the attribute.

An attribute verifier may be a service provider or an independent entity relied on by the service provider to verify that the attribute message can be trusted.

One problem associated with attribute assertion mechanisms is that a series of service providers may collude to obtain more information about the attribute asserter than these service providers are entitled to. For example, if the same attribute message is used with several service providers, those providers can collaborate to determine certain characteristics of the attribute asserter. That is undesirable as it compromises the privacy and anonymity of the attribute provider. In addition, the compromised data can be used for purposes not approved by the attribute asserter.

From the foregoing it will be apparent that there is still a need for an improved technology for providing digital attribute assertions in a manner such that the attribute assertions provided to multiple service providers or attribute verifiers cannot be linked.

SUMMARY OF THE INVENTION

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

The present invention addresses the aforementioned drawbacks of providing digital attribute assertions in a manner such that the attribute assertions provided to multiple service providers or attribute verifiers cannot be linked.

To achieve those and other advantages, and in accordance with the purpose of the invention as embodied and broadly described, the invention proposes a method for operating an attribute assertion device having a processor and memory to create an unlinkable digital signature-equivalent of an assertion message that is verifiable, by a service provider receiving the unlinkable digital signature-equivalent on a service provider device having a processor and memory, as being generated from a digital signature of a known attribute provider having a public key $PK_{AP}$ wherein the unlinkable digital signature-equivalent is created by the attribute assertion device and verifiable by the service provider device without the sharing of a secret cryptographic key between the attribute assertion device and the service provider device, the method comprising operating the processor of the attribute assertion device to transform a digital signature of the attribute message into an unlinkable digital signature-equivalent using a one-way transformation of the digital signature using a first random number generated by the attribute assertion device, and a challenge provided by the service provider device, the first random number held as a secret by the attribute assertion device.

According to an embodiment of the present invention, the digital signature is in a group G having a generator g, the signature-equivalent is a pair wherein the first member of the pair computed from the first random number the challenge (c or $g^c$), and the digital signature, and the second member of the digital signature-equivalent pair is an exponentiation the group generator g to the power of the first random number.

According to an embodiment of the present invention, the method to create an unlinkable digital signature-equivalent of an assertion message according to any previous claims comprises the followings steps:

generating on the attribute assertion device a first random number (k or $g^k$);

generating the unlinkable signature-equivalent using the first random number and the challenge provided by the service provider (715, 717);

transmitting the unlinkable signature-equivalent and the shared random number to the service provider; and on the service provider, verifying the unlinkable signature-equivalent using the challenge, the public key of the known attribute provider, and the shared number.

According to an embodiment of the present invention, the method for operating an attribute assertion device having a processor and memory to create an unlinkable digital signature-equivalent of an assertion message according to the previous claim, further comprises:

on each of the attribute assertion device and the service provider device, computing a value w that is a function of the shared random number and the challenge provided by the service provider (713, 805);

wherein the generating of the unlinkable signature-equivalent comprises using the value w to transform the signature into the signature-equivalent using the secret random value (715); and wherein the verifying of the unlinkable signature-equivalent comprises using a bilinear map e to map the unlinkable signature-equivalent, a hash of the attribute message H(M) and known quantities including the public key of the attribute provider, the computed value w into quantities that may be compared to confirm that the unlinkable signature-equivalent proves that the attribute asserter knows the signature produced by the attribute provider.

According to an embodiment of the present invention, the challenge C is equal to $g^c$ in G, and wherein the attribute assertion device computes w as $(g^c)^k$ in G, the signature equivalent being the pair $S'=(s_1', s_2')=(Sw^r, g^r)$ wherein the s is the digital signature of the attribute message M, w is $(g^c)^k$ in G, and r is the first random number.

According to an embodiment of the present invention, the service provider device verifies S' as being an unlinkable signature-equivalent derived from S (the digital signature of the message M) by:

computing w as $(g^c)^k$ in G;

performing the bilinear mappings v1=e (H(M), $PK_{AP}$) where H(M) is a hash of the message M and $PK_{AP}$ is the public key of the attribute provider, v2=e (s2', g), and v=e (s1',g); and verifying that v=v1*v2 which proves that s' is derived from s.

According to an embodiment of the present invention, the attribute assertion device computes w as H(k||c) wherein c is the challenge from the service provider device, the signature equivalent being the pair $S'=(s_1', s_2')=(Sw^r, g^r)$ wherein the s is the digital signature of the attribute message M, w is H(k||c), and r is the first random number.

According to an embodiment of the present invention, the service provider device verifies S' as being an unlinkable signature-equivalent derived from S (the digital signature of the message M) by:

compute w as H(k||c) wherein c is the challenge from the service provider device;

performing the bilinear mappings v1=e (H(M), $PK_{AP}$) where H(M) is a hash of the message M and $PK_{AP}$ is the public key of the attribute provider, v2=e (s2', g), and v=e (s1',g); and verifying that v=v1*v2 which proves that S' is derived from S.

According to an embodiment of the present invention, the service provider device is a server.

According to an embodiment of the present invention, the method to create an unlinkable digital signature-equivalent of an assertion message comprises the following steps:

generating a secret random number r and a shared random number (K) in Zp;

receiving a challenge C from the service provider wherein C is $g^c$ in G, c being a random value in Zp, g being a group generator for the group G;

on each of the attribute assertion device and the service provider device, computing a value w that has the value $w=g^{kc}$ of the shared random number and the challenge provided by the service provider (713, 805);

generating the unlinkable signature-equivalent using the secret random number and the challenge provided by the service provider, by:

computing $S_1'=Sw^r$, and $S_2'=g^r$, wherein the unlinkable signature-equivalent is $S'=(S_1', S_2')$ transmitting the unlinkable signature-equivalent S' and the shared random secret k to the service provider; and on the service provider, verifying the unlinkable signature-equivalent S' using the challenge, the public key of the known attribute provider, and the shared secret, by:

computing a hash (H(M)) of the attribute message M (805), computing $v_1=e(H(M),PK_{APi})$ computing v2=e(S2',w)

computing v=e (S1', g), and verifying that v=v1*v2 as a proof that the attribute asserter device has knowledge of the signature S without revealing S.

According to an embodiment of the present invention, the method to create an unlinkable digital signature-equivalent of an assertion message comprises the following steps:

generating a secret random number (r) and a shared random number (k) in Zp;

receiving a challenge c in Zp;

on each of the attribute assertion device and the service provider device, computing a value w that has the value w=H(k||c) where H(k||c) is a hash of the shared random number k concatenated with the challenge C provided by the service provider (713, 805);

generating the unlinkable signature-equivalent using the secret random number and the challenge provided by the service provider, by:

computing $S_1'=sw^r$, and $s_2'=g^r$, wherein the unlinkable signature-equivalent is $S'=(S_1', s2)$ transmitting the unlinkable signature-equivalent s' and the shared random secret k to the service provider; and on the service provider, verifying the unlinkable signature-equivalent s' using the challenge, the public key of the known attribute provider, and the shared secret, by:

computing a hash (H(M)) of the attribute message M (805), computing $v_1=e(H(M),PK_{APi})$ computing v2=e(S2',w)

computing v=e (S1', g), and verifying that v=v1*v2 as a proof that the attribute asserter device has knowledge of the signature s without revealing s.

The present invention is also related to an attribute assertion device having a processor, memory, and instruction storage, the instruction storage comprising instructions to cause the attribute assertion device processor to perform the method for operating an attribute assertion device to create a digital signature-equivalent as claimed.

The present invention is also related to a service provider device having a processor, memory, and instruction storage, the instruction storage comprising instructions to cause the service provider device processor to verify an unlinkable digital signature-equivalent provided by the attribute assertion device.

DETAILED DESCRIPTION OF THE INVENTION

Figure 1:
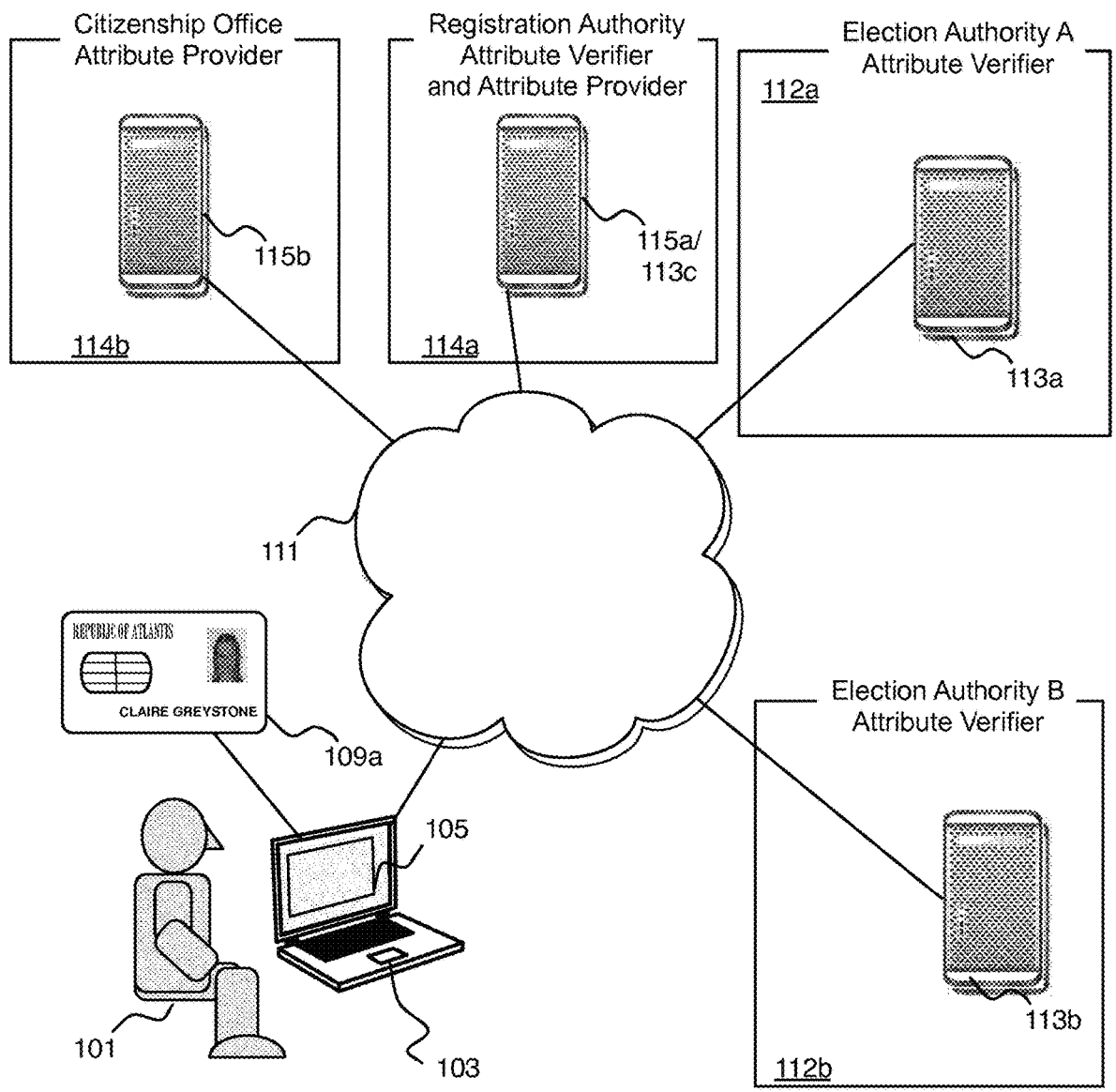
FIG. 1 is a schematic illustration of a network connecting a citizen-host computer with a portable security device, e.g., an electronic identity card, connected thereto to one or more online servers described in greater detail herein below.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment of the invention, a technology is described which provides a secure electronic device with a mechanism by which the secure electronic device can provide a service provider with a certified attribute message that cannot be linked to other attribute messages even if the attribute messages correspond to the same attribute for the same entity (e.g., same individual).

Electronic voting is used herein to provide a context to illustrate the usefulness of the presented technology. However, the technology is in no way limited to electronic voting. Other applications include online commerce, mobile commerce, mobile-ID that can be used to provide physical access to a physical facility, and access to online resources only available based on a user satisfying some attribute, for example, age or membership to an organization.

FIG. 1 is a schematic illustration of a network 111 connecting a citizen-host computer 103 with an attribute assertion device 109, here a portable security device 109a, e.g., in the form of an electronic identity card, connected thereto to one or more online servers described in greater detail herein below. The citizen-host computer 103 is operated by a user 101 who operates a web browser window 105 of a web browser. In the particular context of the present technology the user 101 is a voter in an online election; for example, the user 101 may be a citizen who wishes to cast a vote in a public election. In the example scenario illustrated in FIG. 1, the portable security device 109 may be an electronic citizen identity card. In alternative implementations the portable security device 109a may be any other electronic identity card that provides privacy while operating to identify the holder of the device. While the presented technology is very useful in the context of portable security devices, it is also applicable to other devices that may be used by an entity, e.g., an individual, to prove possession of an attribute.

As is discussed in greater detail herein below, the user 101 (also referred to herein as voter 101), operates the web browser (via the browser window 105) to connect to a server 113a administered by a first election authority 112a to cast a vote in an election. The election authority 112a operates one or more servers 113a, hereinafter, election authority server computer(s) 113a. Having confirmed that a voter 101 is allowed to vote in an election, by way of verifying an attribute message provided to the election authority server 113a, the election authority server computer's role is to record the voter's vote.

The voter 101 also operates the web browser to connect to one or more servers 115a operated by a registration authority 114a. The registration authority's role in the administration of elections is to verify that a voter is eligible to vote in the election. As such, the registration authority may provide an attribute message attesting to the eligibility of the user 101 to vote. That attribute message is provided to the user 101 for storage on the identity card 109a of the user 101.

To prove that the user 101 satisfies the eligibility criteria there may be certain attributes, e.g., age, voting jurisdiction, and citizenship, preloaded on the identity card 109a when the card is personalized for the user by a citizenship office 114b using the attribute provider device 115b. Conversely, since the registration authority 114a verifies voter eligibility, it acts also as an attribute verifier, in this example; thus, the server operated by the registration authority 114a may also be viewed as an attribute verification device 113c.

As noted above, the voter registration attribute may be used in multiple independent elections. For example, the voter registration may be used in national elections as well as in local elections. Thus, there may be many election authorities, for example, as depicted in FIG. 1, election authority 112b operating the election authority server which operates as an attribute verification device 113b. To assure anonymity and privacy, the multiple election authorities should not be able to link the attribute messages provided to them by the user 101 even if the underlying attribute is the same voter registration attribute.

Figure 2:
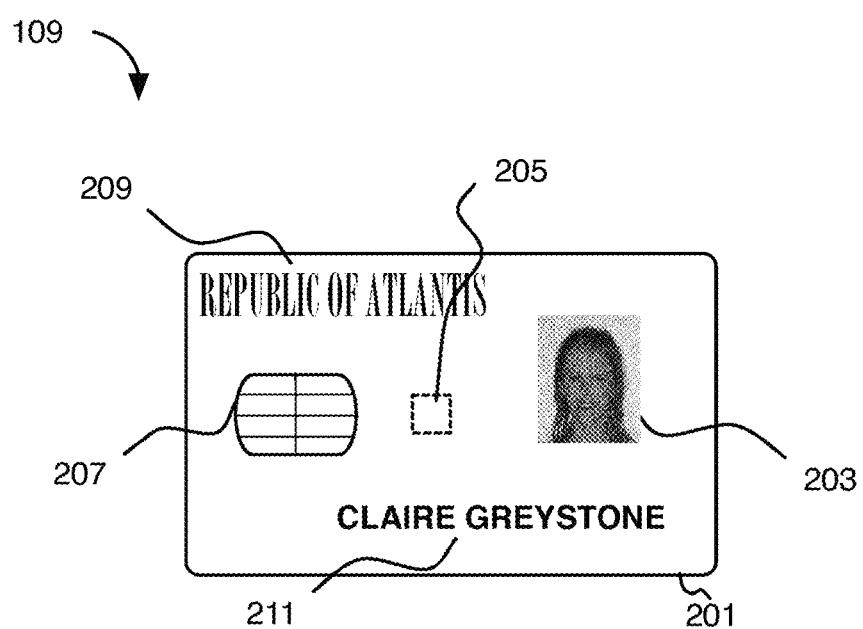
FIG. 2 is a top-view of an exemplary attribute assertion device, for example, as herein, an electronic identity card, here implemented as a smartcard.

FIG. 2 is a top-view of an electronic identity card 109a, for example, implemented here as a smartcard. The electronic identity card 109a typically encompasses a plastic substrate 201. The integrated circuit card further includes an embedded integrated circuit card chip 205, which is typically connected to a contact pad 207. In alternative embodiments, the integrated circuit card chip may connect to external readers using connectors such as Universal Serial Bus (USB) connectors or wirelessly using techniques such as near-field communication (NFC) or radio-frequency identification (RFID) protocols.

The electronic identity card 109a typically includes some physical identifying information, e.g., a logo 209 identifying the issuing country of origin, a photograph 203 and a name 211 of the person who is citizen to which the electronic identity card has been issued, i.e., herein the voter 101. While these are mere visual manifestations of the personal nature of the electronic identity card 109a, they are indicative of the personal nature of each individual card. The issuing authority also personalizes the specific electronic identity card 109a assigned to a citizen by storing information pertinent to that citizen and with applications that the citizen can execute using the identity card 109a in non-volatile memory of the card. For example, cryptographic keys associated with the citizen may be stored on the identity card 109a during card personalization. These cryptographic keys include the private key of the citizen. Furthermore, as discussed herein below, the identity card 109a may store attribute messages provided by an attribute provider, a public key of the attributed provider, and associated signatures.

The electronic identity card 109a may further store biographic information such as name, date-of-birth, gender, address, nationality, municipality etc. of the holder of the card. This information may be stored in the form of digital attributes as described herein below.

Figure 3:
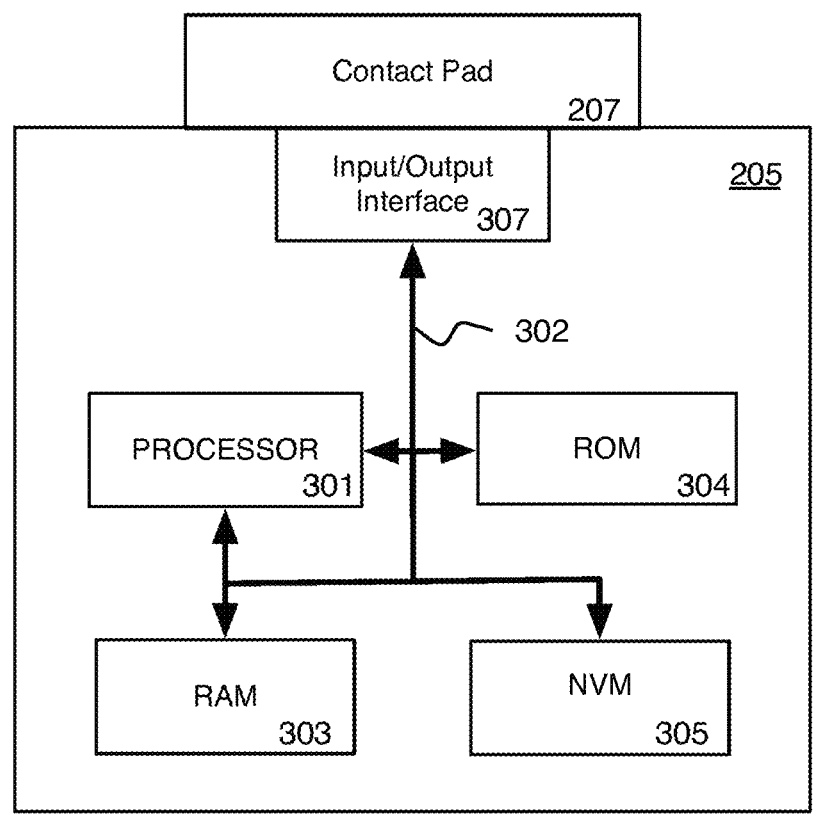
FIG. 3 is a schematic illustration of the hardware architecture of an electronic identity card, specifically, a chip-module of an electronic identity circuit card, which may be considered an exemplary attribute assertion device.

FIG. 3 is a schematic illustration of the hardware architecture of an exemplary attribute assertion device 109, specifically, the chip-module 205 of an electronic identity circuit card 109a. The chip-module 205 may include a processor 301 connected via a bus 302 to a random access memory (RAM) 303, a read-only memory (ROM) 304, and a non-volatile memory (NVM) 305. The chip-module 205 further includes an input/output interface 307 for connecting the processor 301, again typically via the bus 302, to the connector pads 207 by which the electronic identity card 109a may be connected to a card reader. The electronic identity card 109a may alternatively connect to the outside world wirelessly and would in such embodiments typically include an antenna rather than the connector pads 207. It should be noted that the chip-module 205 may, alternatively, be located in a SIM card (also known as a Universal Integrated Circuit Card (UICC)), embedded Secure Element (GlobalPlatform, GlobalPlatform made simple guide: Secure Element, https://www.globalplatform.org/mediaguideSE.asp, accessed on, Jul. 27, 2015), a Micro SD card, or similar secure device.

The ROM 304 may or may not be present. Herein is described a technology in which much of the functionality that has hitherto been placed in ROM is now located in the NVM 305. However, that does not preclude that the electronic identity card 109a has a ROM for some other purpose.

Figure 4:
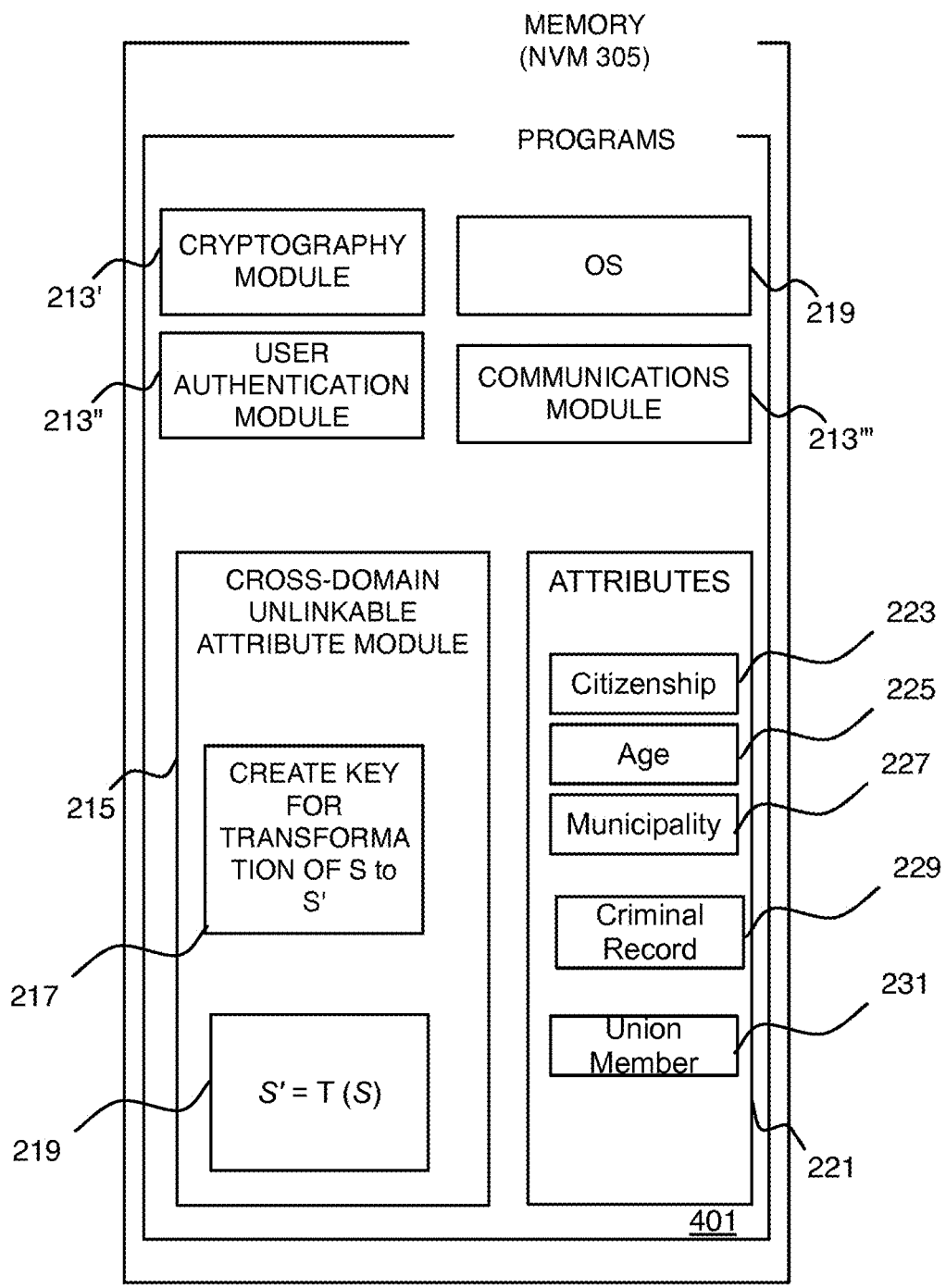
FIG. 4 is a schematic illustration of computer programs loaded onto an attribute assertion device, e.g., an electronic identity card, as well as data such as cryptographic keys supporting cross-domain unlinkable pseudonym applications used as described herein below.

FIG. 4 is a schematic illustration of computer programs 401 that may be loaded onto an attribute assertion device 109, for example into the NVM 305. While it is here depicted that the computer programs 401 are all co-located in the NVM 305, in actual practice there is no such restriction as programs may be spread out over multiple memories and even temporarily installed in RAM 303. The programs 401 include operating system programs as well as application programs loaded on to the electronic identity card 109. While FIG. 4 illustrates example contents of an example attribute assertion device 109, other embodiments of an attribute assertion device 109 may include other contents and may not necessarily include all the items illustrated in FIG. 4.

The attribute assertion device 109 programs 401 may include the operating system OS 219 as well as other system programs 213, e.g., cryptography module 213', user authentication module 213", and communications module 213'". The system programs 213 may include whatever functionality the electronic identity card 109 is required to perform, for example, cryptography and communications aspects of the methods described herein.

The attribute assertion device 109 programs 401 may further include a cross-domain unlinkable attribute module 215 for causing the attribute assertion device 109 to perform card-side operations of a cross-domain unlinkable attribute operation as described in greater detail herein below, for example, in conjunction with FIGS. 5 through 8. The cross-domain unlinkable attribute module 215 contains a key material module 217 to cooperate with a service provider 112 attribute verification device 113 to create key material that may be used to provide a digital-signature equivalent s' of a digital signature s of an attribute message M. The cross-domain unlinkable attribute module 215 further includes a transformation function 219 for transforming the digital signature s into the digital signature-equivalent s' using the key material created with the service provider attribute verification device 113. A property of a digital-signature equivalent s' is that the service provider attribute verification device 113 may verify that the signature-equivalent s' was created from a legitimate signature s from a known attribute provider without the signature s being revealed. Further subsequent signature-equivalents may not be linked, e.g., if both s" and s' were generated from s, that fact cannot be determined from viewing s" and s' separately or together.

The memory 305 may also store a number of attribute messages 221. Attributes 221 may be data structures that prove to an inquirer that the holder of the electronic identity card 109 satisfies some particular quality, e.g., citizenship, without revealing the identity of the holder of the electronic identity card 109. Thus, if a voter 101 must establish that he or she is a citizen of a jurisdiction holding an election, the administration of the election may request the citizenship attribute 223 be provided by the electronic identity card 109. Other attributes useful in a public election context include age 225 and municipality 227. Further, a person's criminal record 229 may disqualify a potential voter. In special elections such as elections run by a particular organization, such as a national union, membership 231 to the organization may be relevant. Alternatively, an attribute may simply be a credential signifying that the voter 101 is eligible to vote in a given election.

An attribute message is a data structure provided by an attribute provider 115 that makes an assertion about some characteristic, e.g., as here, the eligibility to vote. The attribute provider 115 is an external entity that has some knowledge about the characteristic being asserted by the attribute, i.e., a government entity that keeps citizenship records. The attribute assertion is provided as a message, the attribute message, which is digitally signed by the attribute provider using the attribute provider's private key. Thus, a verifier may verify that the assertion made via the attribute is correct by verifying the signature provided as being that of the attribute provider. Herein, attribute, unless the context is clear to the contrary, refers to such a digital attribute provided by an attribute provider. Thus, each attribute message, M, has a digital signature, s, associated therewith. The digital signature s is created by the attribute provider 115 using a private key $SK_{AP}$. The corresponding public key $PU_{AP}$ is known by all the parties, e.g., the attribute asserter and the service provider.

Thus, when an attribute assertion device 109 provides an attribute, e.g., citizenship 223, that attribute is a signed data item, an attribute message M, that (1) asserts the citizenship and that (2) may be verified as having been provided by a trusted attribute provider based on a digital signature s of the attribute provider.

Turning now to use of the technology to provide for a secure and flexible mechanism for providing unlinkable attributes according to several embodiments.

Figure 5:
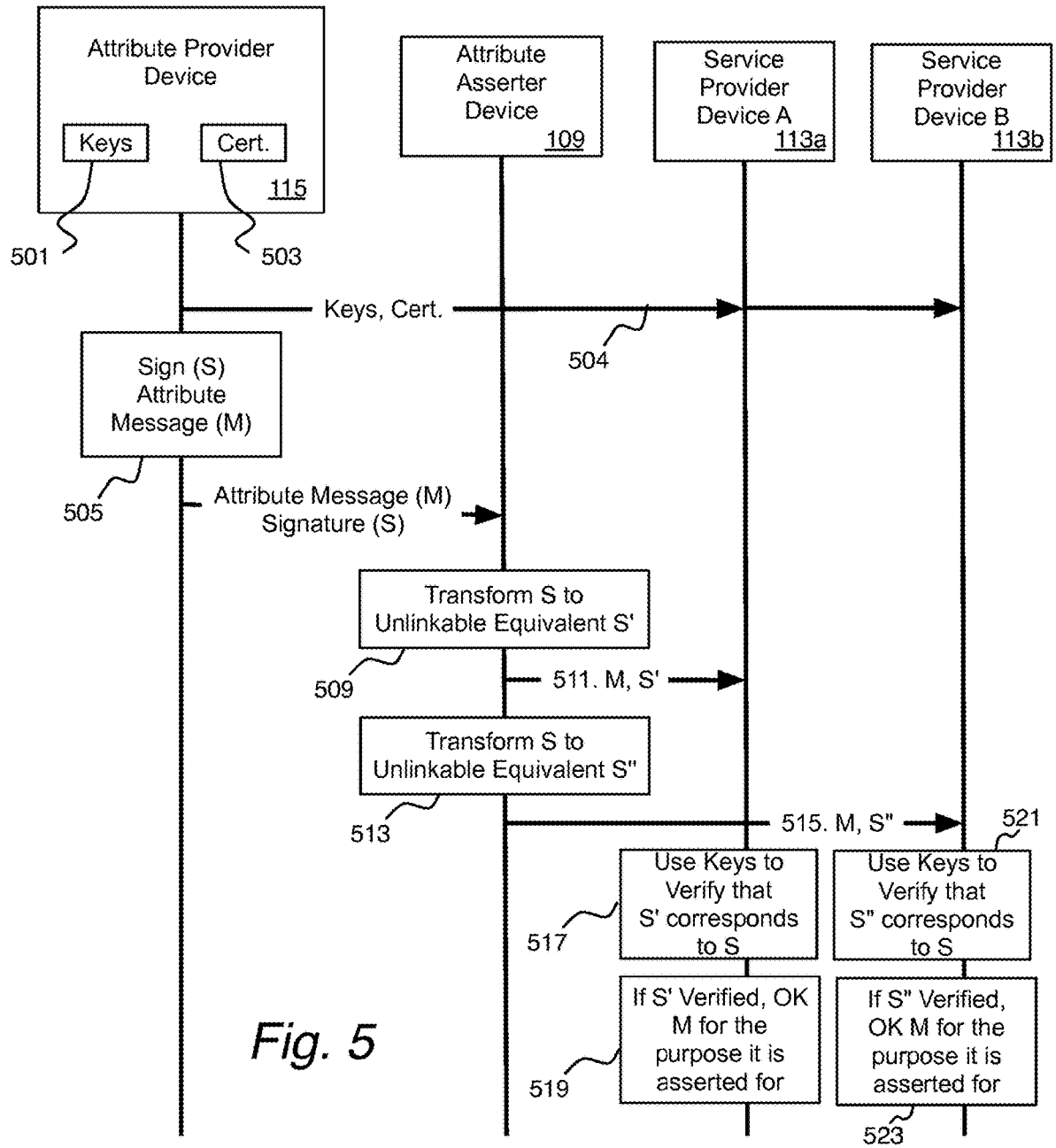
FIG. 5 is a high-level timing-sequence diagram that illustrates a first embodiment providing unlinkability of attribute messages provided to multiple service providers.

FIG. 5 is a high-level timing-sequence diagram that illustrates a first embodiment providing unlinkability of attribute messages provided to multiple service providers. The described mechanism for providing unlinkability of attributes as described herein protects the attribute message against linking the signatures (or more accurately, equivalents to the signatures) provided to different service providers as corresponding to one original signature.

The attribute provider 114, specifically on an attribute provider device 115, has in its possession keys 501 by which it may sign the attribute message M producing a digital signature S. The attribute provider 114 may further be in possession of a digital certificate 503 that proves that the attribute provider 114 is the true owner of the key used to sign the attribute message M. The signature S may be used to create unique signatures for each assertion of the attribute to one or more service providers.

As will be discussed in greater detail herein below, the signature S is produced by the attribute provider using cryptographic keys. In a preferred embodiment discussed herein below, a public key cryptography key pair, i.e., comprising a private key and public key, is used for this purpose. Specifically, the private key is used for signing the attribute message and the public key may be used to verify the signature. These keys are transmitted to any service provider attribute verification device 113 that needs to verify an attribute message and the associated signature equivalent, Step 504.

Step 505. The attribute provider 114 signs the attribute message M producing the signature S.

Step 507. The attribute provider 114 transmits the attribute message M and the digital signature S to the attribute asserter 109. This step may be either during the personalization of the attribute asserter security device 109a or may be provided at a later stage, for example, in conjunction with an online communication such as when the user 101 demonstrates to an attribute provider that he or she satisfies the criteria associated with the attribute. The attribute asserter 109a may then use the signature S to produce signature equivalent contents that are unique to each service provider to which the attribute asserter wishes to assert the attribute. The mechanism for that is discussed in greater detail below in conjunction with FIGS. 6 and 7.

Step 509. The attribute asserter 109 transforms the signature S into an unlinkable signature equivalent S' that corresponds to a service provider A attribute verification device 113a.

Step 511. The attribute asserter 109 transmits the attribute message M and the unlinkable signature equivalent S' to the service provider A attribute verification device 113a.

Step 513. If the attribute asserter 109 wishes to use the same signature S with another service provider, say service provider B attribute verification device 113b, the attribute asserter 509 transforms the signature S into yet another equivalent S", this time corresponding to the service provider B attribute verification device 113b.

Step 515. The attribute asserter 109 transmits the attribute message M and the unlinkable signature equivalent S" to the service provider B attribute verification device 113b.

Properties of the signature equivalents S' and S" include that the attribute asserter 109 creates both (and any further signature equivalents associated with yet other service providers) from the same signature S, that the service provider attribute verification devices 113 may verify that the signatures S' and S" correspond to a valid signature S that is a signature of the attribute message M, which was signed by the attribute provider device 115 using the key of the attribute provider, e.g., the public key of the attribute provider. However, it is not possible to derive S from S' or S". Furthermore, it is not possible to link S' and S" (or any other signature equivalent produced as described herein below).

Step 517. The Service Provider A attribute verification device 113a verifies that S' corresponds to a signature S that is a valid signature of M when signed by the key of the attribute provider. The Service Provider A attribute verification device is aware of a key belonging to the attribute provider that signed M, which can then be used to verify the authenticity of a signature-equivalent without knowing the signature. As the attribute provider does not provide S but S', the attribute verifier uses a special technique, described herein below, to verify the correspondence of S' to S.

Step 519. The Service Provider A attribute verification device 113a accepts the attribute assertion associated with the attribute message M if the correspondence between a public key $PK_{AP}$ of the attribute provider that signed M and S' is verified. As noted, this verification is performed without the knowledge of S; only the signature-equivalent S', the public key $PK_{AP}$, and the message are known to an attribute verification device 113.

Steps 521 and 523. The service provider B attribute verification device 113b performs a similar correspondence verification vis-à-vis the signature S" that results from an attribute assertion of the attribute provider device 115 with the service provider B attribute verification device 113b.

Figure 6:
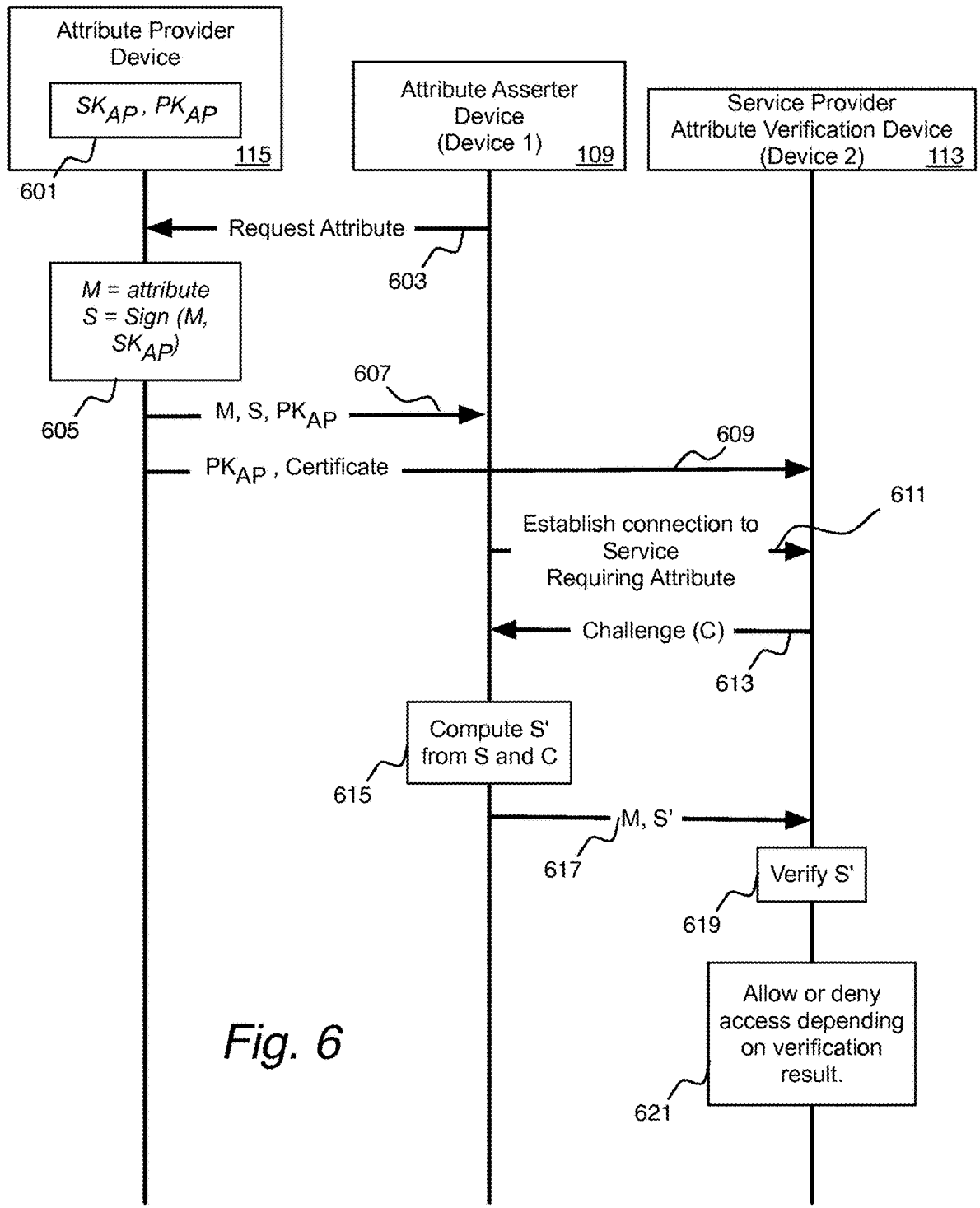
FIG. 6 is a timing sequence diagram illustrating the computation of the signature equivalent S' corresponding to the signature S of an attribute message M by the service provider A according to an embodiment of the invention.

FIG. 6 is a timing sequence diagram illustrating the computation of the signature equivalent S' corresponding to the signature S of an attribute message M by the service provider A according to an embodiment of the invention. Naturally, the computation proceeds in a similar fashion for other service providers.

The technology described herein relies on the abstract algebra concept of groups. The mathematics of groups is beyond the discussion of this paper. The reader is referred to John A. Beachy and William D. Blair, *Abstract Algebra*, 3d. Edition, Waveland Press Inc., Long Grove, Ill. (incorporated, in its entirety, herein by references) for a detailed explanation of abstract algebra including groups. Another important mathematical concept used herein is algebraic pairing. An accessible discussion of pairings may be found in Craig Costello, Pairings for beginners, https://www- .google.com/url?sa=t&rct=j&q=&esrc=s&source=web&cd=1&cad=rja&uact=8&ved=0CB4QFjAAahUKEwjjnMThmeHIAhVSzmMKHYIMBjkQFggdMAA&url=http%3A%2F%2Fwww.craiqcostello.com.au%2Fpairings%2FPairingsForBeginners.pdf&usg=AFQjCNHW8PdtLIWvgaFEu_EfwEcCjejg_g, accessed on Oct. 26, 2015. Costello is incorporated herein by reference in its entirety. The technology described herein is based on D. Boneh, C Gentry, H. Shacham and B. Lynn, Aggregate and Verifiably Encrypted Signatures from Bilinear Maps, Eurocrypt 2003, LNCS 2656, pp. 416-432, 2003 (http://crypto.stanford.edu/~dabo/pubs/papers/aggreg.pdf, accessed on Oct. 26, 2015). Boneh et al. is incorporated herein by reference in its entirety.

In a preferred embodiment, the attribute provider device 115 uses public key cryptography to sign the attribute message M. Thus the attribute provider has associated therewith a PKI key pair 601: public key $PK_{AP}$ and a private (secret) key $SK_{AP}$. In an alternative embodiment a shared secret may be used.

Step 603: The attribute asserter, e.g., an individual seeking to assert an attribute such as citizenship, operates the attribute asserter device 109 to request an attribute.

Step 605: The attribute provider device 115 creates an attribute message M and digitally signs the attribute message M using the attribute asserter's private key $SK_{AP}$ producing a digital signature S. This step may be made during the issuance of a device to the attribute asserter. For example, if the attribute asserter device is an electronic identification card with an embedded integrated circuit card, the attribute message M, the digital signature s, and the public key $PK_{AP}$ that corresponds to private key $SK_{AP}$ and that was used to sign the attribute message M may all be stored on the attribute asserter device 109 during, for example, personalization of the device.

Step 607: Alternatively, i.e., if the attribute asserter device 109 is not pre-provisioned with the attribute message M, the digital signature S, and the public key $PK_{AP}$, these quantities are transmitted by the attribute provider device 115 to the attribute asserter device 109. The three quantities do not necessarily have to be provided by the attribute provider. For example, public key $PK_{AP}$ for the attribute provider may be obtained from a third party. Optionally, the public key $PK_{AP}$ may be accompanied by a digital certificate from a certificate authority to further demonstrate the veracity of the digital signature s.

Step 609: the public key of the attribute provider, $PK_{AP}$, as well as the optional certificate are also provided to a service provider attribute verification device 113 to which the user is seeking access. As illustrated here the public key $PK_{AP}$ and certificate are transmitted from the attribute provider device 115 to the service provider attribute verification device 113. However, this may happen at any time, e.g., the service provider attribute verification device 113 may be provisioned with the attribute provider key and certificate at the time that the attribute provider device 115 is first issued to a user as part of an issuance of related devices. The public key $PK_{AP}$ and the certificate are not necessarily provided by the attribute provider. For example, a third party may act as a repository for public keys and certificates for a number of attribute providers.

Step 611: The utility of the attribute message M is to allow for the assertion of the associate attribute with a service provider 112. For example, the attribute may be used to establish that the user is a member of a particular group of people who have the right to access the service provider services. Thus, a connection is established between the attribute asserter device 109 and the service provider attribute verification device 113 that requires confirmation that the user possesses a required attribute.

As illustrated in FIG. 6, the user may be operating a web browser session with the service provider attribute verification device 113 on a user computer different from the attribute asserter device 109, for example, a host computer having a smart card connected thereto and acting as the attribute asserter device 109 or a mobile telephone and a UICC installed therein wherein the UICC acts as the attribute asserter device 109. That web session may then initiate a communications link between the attribute asserter device 109 and the service provider device attribute verification device 113, often referred to as a service provider server.

Step 613: To demonstrate that the user has the desired attribute the service provider attribute verification device 113 transmits a challenge C to the attribute asserter device 109. The challenge C is used by the attribute asserter to demonstrate that it is in possession of the signature s from the attribute provider device 115 without revealing S. Typically the challenge C would be a random value generated by the service provider attribute verification device 113.

Step 615: the attribute asserter device 109 computes a signature-equivalent S' as a function of s and C. As discussed herein below, the signature-equivalent S' may be used by the service provider device 113 to confirm that the attribute asserter device 109 is in possession of S and that S is a valid signature of the attribute message M. The computation of S' by the attribute asserter device 109 is described herein below.

Step 617: the attribute asserter device 109 responds with the attribute message M and the signature-equivalent S'. Any other material needed by the service provider to verify S' without revealing S may also be transmitted to the service provider 113 (see discussion herein below in conjunction with Step 719 of FIG. 7).

Step 619: the service provider attribute verification device 113 receives the attribute message M and the signature-equivalent S'. The service provider attribute verification device 113 verifies that S' corresponds to a valid signature S from the attribute provider device 115 using the public key $PK_{AP}$ of the attribute provider and the challenge C.

Step 621: if the verification result confirms that S' corresponds to a valid signature S of the message M, then access to the desired service is provided. Otherwise, service is denied.

Turning now to the computation of S' by the attribute asserter device 109 in Step 615. Every time that the attribute asserter device 109 wishes to use the pair attribute message M and the associated digital signature s to communicate an attribute assertion to a service provider attribute verification device 113, the attribute asserter device receives the challenge C from the service attribute verification device 113. The attribute asserter device 109 transforms the signature s using a mathematical transformation T (r,k,C,S) S'. The elements r and k in this equation are random values generated by the attribute asserter device 109 and C is the challenge sent by the service provider attribute verification device 113 in step 613.

One desirable characteristic of the transform T is that it should be difficult to discern S from S'. It should also be difficult to discern that S' and S" are both derived from S (i.e., it should not be possible to tell if S'=T(r',k',C',S) and S"=T(r",k",C",S) or if S'=T(r',k',C',s) and S"=T(r",k",C",S*) where S≠S*.

For state-of-the-art verifiable encrypted signature, an external party (an adjudicator) possesses an adjudicator's public key $PK_{adj}$ and corresponding private key $SK_{adj}$. The signature s is encrypted with the public key $PK_{adj}$ and the adjudicator uses the private key $SK_{adj}$ to ensure that the verifiable encrypted signature is valid. In this context the message is signed by the prover (device).

Conversely, according to an embodiment of the present invention, the public key is created interactively by the device and the service provider; this public key is created dynamically and it is used only for the purpose of one authentication protocol; in other words, that one-use public key is used to transform the signature s for one particular incident of authentication. Therefore, no one knows the corresponding private key. The attribute asserter (operating attribute asserter device 109) is ensured that the service provider attribute verification device 113 (as well as anyone else) cannot link the transformed (encrypted) s' with the secret s. And the service provider 113 is ensured that the device knows the secret s.

A transformation T according to the invention uses a bilinear map e as follows:

Let $G_1$ and $G_2$ be two multiplicative groups of prime order p; $g_1$ is a generator of $G_1$ and $g_2$ is a generator of $G_2$. Let $G_T$ be also a group of prime order p The map e is a computable bilinear map, $e: G_1 \times G_2 \rightarrow G_T$ For simplicity, consider in the following that $G=G_1=G_2$ where g is the generator of G. However, in an alternative embodiment, the condition may be $G_1 \neq G_2$. The map e is then a computable bilinear map, $e: G \times G \rightarrow G_T$. The map is a pairing from which it follows that for all a and b, $e(g^a, g^b) = e(g, g^{ab})$. The map is not-degenerate; i.e., $e(g,g) \neq 1$.

Another aspect of the technology to prepare an unlinkable attribute assertion is a hash function H. The hash function H is defined such that H: $(0,1)^* \rightarrow G$. In the general case, H is a hash function H: $\{0,1\}^* \rightarrow G_1$. In one embodiment the hash function H is SHA-256.

As noted above, the attribute provider i, $AP_i$ 109 is related to a private key $SK_{APi}$, which is denoted here as x, where x is an integer in Zp. The corresponding public key, $PK_{APi}$, is defined as $PK_{APi} = g^x$ where g is the generator for a group G.

Figure 7:
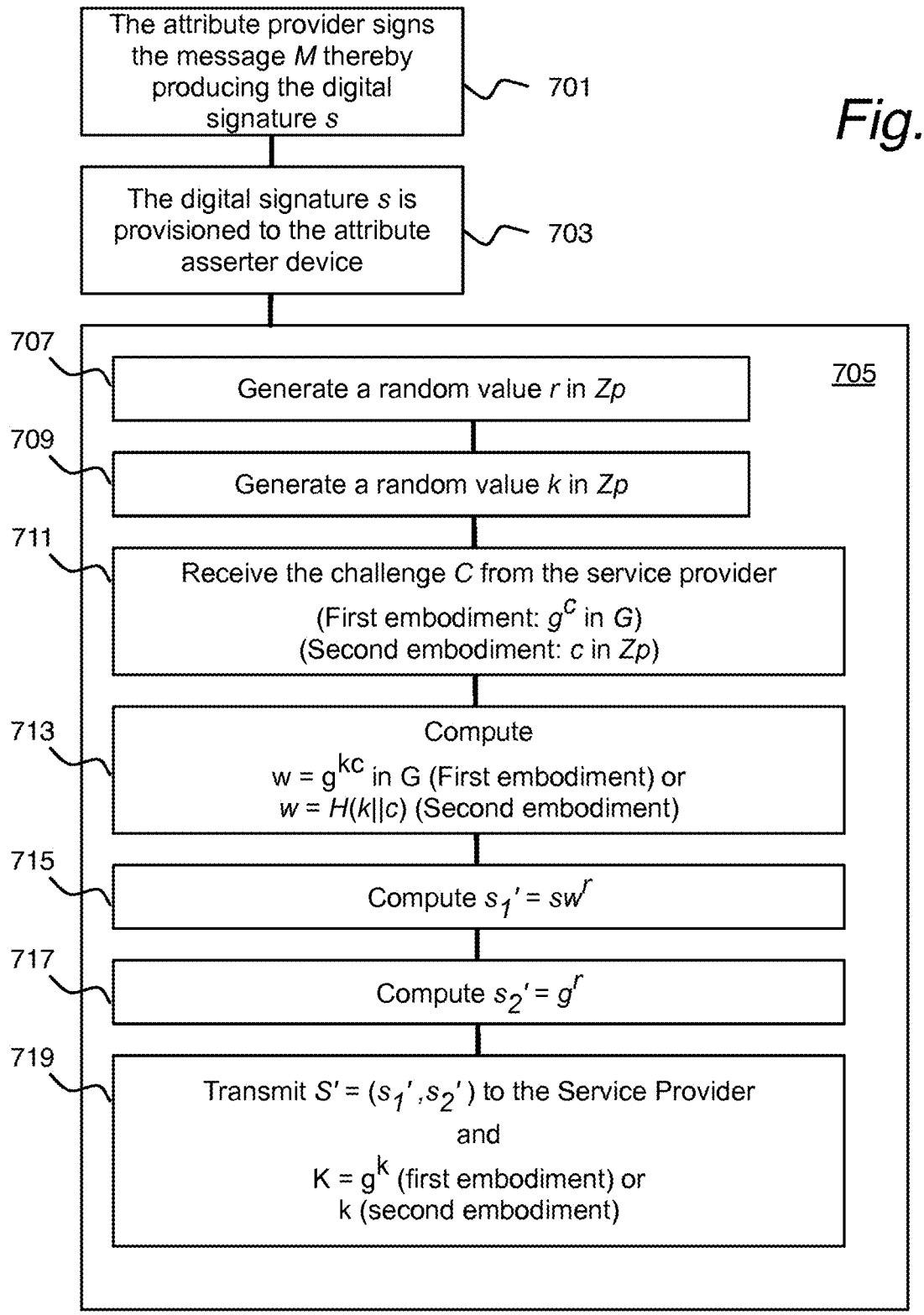
FIG. 7 is a flow-chart illustrating the process of producing a signature-equivalent s' beginning with the creation of the corresponding digital signature s.

FIG. 7 is a flow-chart illustrating the process of producing a signature-equivalent s' beginning with the creation of the corresponding digital signature s.

Step 701: The attribute provider device 115 signs the attribute message M using the hash function H and the attribute provider's private key x (also, $PK_{APi}$):

$$s = H(M)^x$$

where H(M) is in G.

Step 703 (e.g., Step 607 (FIG. 6)): the signature S is securely provisioned to the attribute asserter device 109.

Step 705: For each use of the pair M, S the attribute provider device 109 performs the following steps:

Step 707: Generate a random value r in Zp

Step 709: Generate a random value k in Zp

Step 711: Receive the challenge from the service provider attribute verification device 113. In a first embodiment, the challenge is $C=g^c$ in G with c in Zp. In a second embodiment, the challenge is simply c in Zp.

Step 713: Compute w. In the first embodiment, where the challenge is $C=g^c$, $w=g^{kc}$. In the alternative embodiment, wherein the challenge is c in Zp, $w=H(k\|c)$ wherein $k\|c$ is a concatenation of the random value k and c.

The attribute asserter may, optionally, also compute H(M) to verify that the signature S corresponds to the message M.

Step 715: Compute $s_1' = sw^r$

Step 717: Compute $s_2' = g^r$

The signature-equivalent s' is the pair $(s_1', s_2')$. In other words, the above calculations operate to transform the signature S into S' as $$S' = (s_1', s_2') = (sw^r, g^r)$$

Random value r remains a secret only known to the attribute asserter 109. However, in the first embodiment, $K=g^k$ is transmitted to the service provider attribute verification device 113. The random value k alone is transmitted to the service provider attribute verification device 113 in the second embodiment.

Step 719 (Step 617): The signature-equivalent s' is transmitted to the service provider attribute verification device 113 together with the random value K or k (in the second embodiment).

Figure 8:
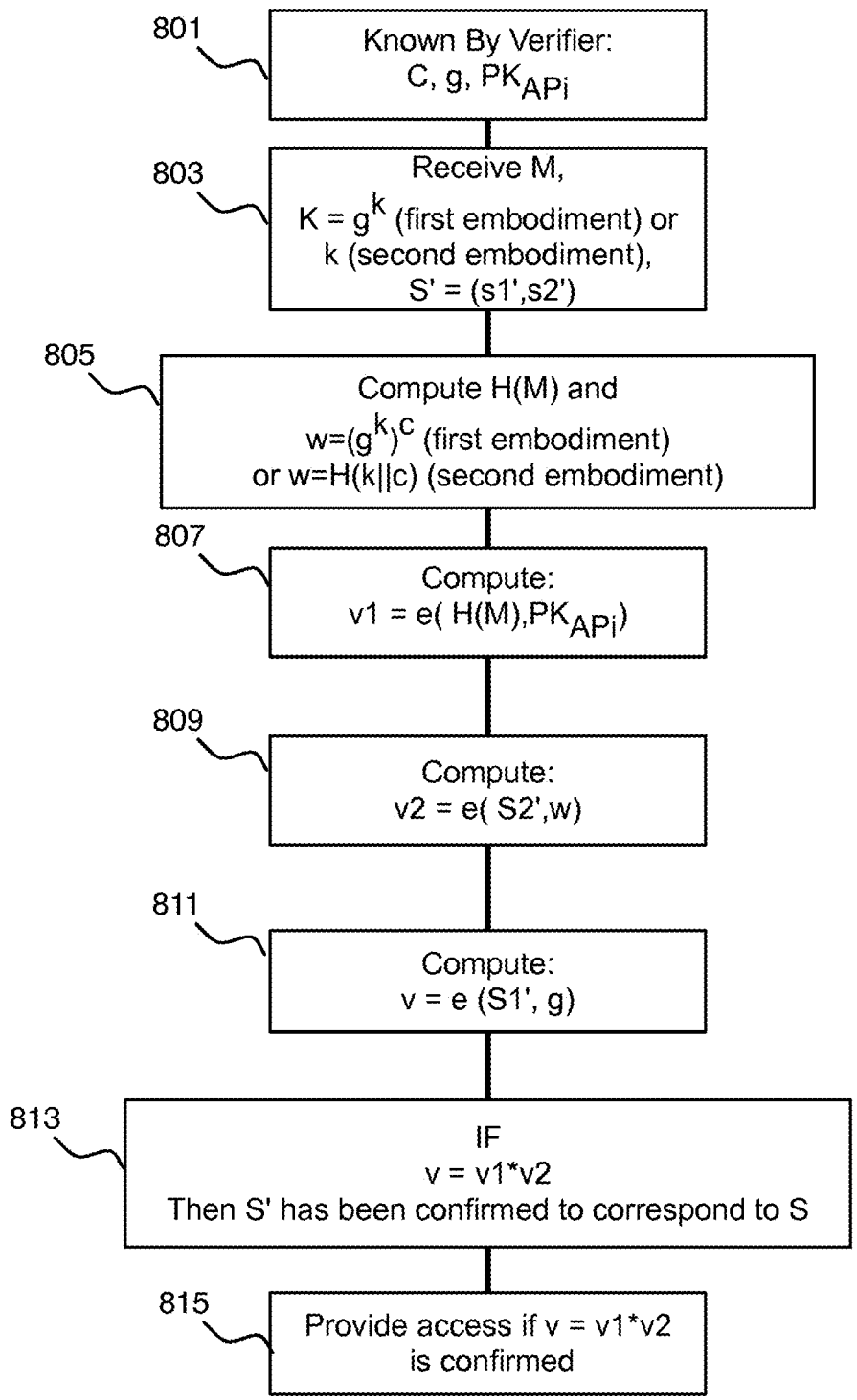
FIG. 8 is a flow-chart illustrating the steps of the service provider attribute verification device to verify the signature-equivalent s' as a true equivalent of a signature s produced by the attribute provider device.

FIG. 8 is a flow-chart illustrating the steps used by the service provider attribute verification device 113 to verify that the signature-equivalent S' as a true equivalent of a signature S produced by the attribute provider device 115.

Step 801: The quantities c or C (depending on whether the challenge is c or $C=g^c$, g, and $PK_{APi}$) are known by the service provider 113. The challenge $C=g^c$ or c is generated by the service provider attribute verification device 113 and transmitted to the attribute asserter device 109 as a challenge. g is the generator for the group G; this value is pre-agreed upon by the parties involved. Alternatively, attribute provider 115 or attribute asserter 109 may provide this value to the service provider attribute verification device 113; it is not a secret quantity. Similarly, $PK_{APi}$, the public key of the attribute provider 109, is provided by the attribute provider 109 to the service provider attribute verification device 113 in message 504 (FIG. 5).

Step 803: The service provider attribute verification device 113 receives the attribute message M and the value $K=g^k$ or the random value k, respectively, depending whether the challenge is $C=g^c$ (first embodiment) or c (second embodiment) from the attribute asserter 109.

Step 805: The service provider attribute verification device 113 computes the values H(M) and $w=K^c=g^{kc}$ (first embodiment) or $H(k\|c)$ (second embodiment). The same hash function H is used as the hash function used by the attribute asserter 109.

Step 807: The service provider attribute verification device 113 computes a value $v_1$ using the mapping function e introduced hereinabove:

$$v_1 = e(H(M), PK_{APi})$$

where, H(M) is the hash value computed in Step 805 and $PK_{APi}$ is the public key of the attribute provider device 115

Step 809: The service provider attribute verification device 113 computes a value $v_2$ using the mapping function e introduced hereinabove:

$$v_2 = e(s_2', w)$$

where, $S_2'$ is the second member of the pair $(s_1', s_2')$ which is provided as the signature-equivalent s in Step 803 and $PK_{APi}$ is the public key of the attribute provider 115.

Step 811: The service provider attribute verification device 113 computes a value v using the mapping function e introduced hereinabove:

$$v = e(s_1', g)$$

Step 813: As is shown herein below, the quantity v should equal the product $v_1 * v_2$ if S' is indeed generated from a signature s produced by the attribute provider device 113 using the public key $PK_{APi}$. Accordingly, the service provider performs the comparison to determine if $v = v_1 * v_2$.

Step 815: If the verification of $v=v_1*v_2$ has been established, then the attribute of attribute message M is proven, and the service provider attribute verification device 113 grants the user access to the service requested.

Turning now to an explanation proving the correctness of the calculation of FIG. 8 to verify that s' is a correct signature-equivalent of the signature s as provided by the attribute provider device 115.

As noted above the bilinear mapping e(a,b) in G is a pairing. A property of a pairing is that:

$$e(g^a,g^b)=e(g,g^{ab})$$

From this, it follows that:

$$e(x^a,y^b)=e(x,y^{ab})$$

for any x, y in G
$v_1*v_2$ is by definition:

$$v_1*v_2=e(H(M),PK_{APi})*e(s_2',w)$$

$PK_{APi}$ was generated using $g^x$ and $s_2'$ was calculated as $g^r$. Thus, we can substitute these quantities for $PK_{APi}$ and $s_2'$, respectively:

$$v_1*v_2=e(H(M),g^x)*e(g^r,w)$$

Apply the property that $e(x^a,y^b)=e(x,y^{ab})$ $$v_1*v_2=e(H(M)^x,g)*e(g,w^r)$$

It is a property of a pairing that e(x,g)=e (g,x), from which the above may be arranged as:

$$v_1*v_2=e(H(M)^x,g)*e(w^r,g)$$

It is also a property of a pairing that $e(x,g)*e(y,g)=e(x*y,g)$. Therefore, the above may be re-written as:

$$v_1*v_2=e(H(M)x*w^r,g)$$

Substitute s for H(M)x $$v_1*v_2=e(s*w^r,g)$$

By definition $s_1'=s*w^r$. Thus, the above may be rewritten as $$v_1*v_2=e(s_1',g)$$

Note that v was independently computed as e $(S_1', g)$ in Step 811. Thus, v should equal $v_1*v_2$. This results confirms that the verification process of FIG. 8 confirms from s' that the message M was signed by the attribute provider having the key pair $SK_{AP}$, $PK_{AP}$.

From the foregoing it is apparent that a technology is described herein for enhancing a secure electronic device by providing unlinkable attribute messages in a secure, flexible and efficient manner. The attribute messages may be verified as having been signed by an authorized attribute provider. While the attribute message may be verified as having been signed by an attribute provider, subsequent assertions of the attribute message may not be linked to the original assertion because all attribute assertions will use different signature-equivalents as each is derived from a new challenge from the service provider as well as using random numbers generated and kept secret by the attribute asserter.

Although specific embodiments of the invention have been described and illustrated, the invention is not to be limited to the specific forms or arrangements of parts so described and illustrated. The invention is limited only by the claims.

The invention claimed is:

1. A method for operating an attribute assertion device having a processor and memory to create an unlinkable digital signature-equivalent of an assertion message that is verifiable, by a service provider receiving the unlinkable digital signature-equivalent on a service provider device having a processor and memory, as being generated from a digital signature (S) of a known attribute provider having a public key $PK_{AP}$, wherein the digital signature is in a group G having a generator g, and wherein the unlinkable digital signature-equivalent is created by the attribute assertion device and verifiable by the service provider device without the sharing of a secret cryptographic key between the attribute assertion device and the service provider device, the method comprising:

operating the processor of the attribute assertion device to transform a digital signature of the attribute message into an unlinkable digital signature-equivalent using a one-way transformation of the digital signature using a first random number generated by the attribute assertion device, and a challenge provided by the service provider device, the first random number held as a secret by the attribute assertion device by:
generating a secret random number (r) and a shared random number (k) in Zp;
receiving the challenge from the service provider;
on each of the attribute assertion device and the service provider device, computing a value w that is a function of the shared random number and the challenge provided by the service provider;
generating the unlinkable signature-equivalent (S') that is a pairing of a first product ($S_1'$) and a second product ($S_2'$), wherein the first product ($S_1'$) is the product of the digital signature (S) and the value w to the power of the generated random number (r) ($S_1'=Sw^r$) and the second product ($S_2'$) is the generator g to the power of the generated random number (r) ($S_2'=g^r$); and
transmitting the unlinkable signature-equivalent S' and the shared random secret k to the service provider; and
on the service provider, verifying the unlinkable signature-equivalent S' using the challenge, the public key of the known attribute provider, and the shared secret.

2. The method for operating an attribute assertion device having a processor and memory to create an unlinkable digital signature-equivalent of an assertion message according to claim 1, further comprises:
wherein the verifying of the unlinkable signature-equivalent comprises using a bilinear map e to map the unlinkable signature-equivalent, a hash of the attribute message H(M) and known quantities including the public key of the attribute provider, the computed value w into quantities that may be compared to confirm that the unlinkable signature-equivalent proves that the attribute asserter knows the signature produced by the attribute provider.

3. The method for operating an attribute assertion device having a processor and memory to create a digital signature-equivalent of an assertion message according to claim 2, wherein the challenge C is equal to $g^c$ in G, and
wherein the attribute assertion device computes w as $(g^c)^k$ in G, the signature equivalent being the pair $S'=(s_1', s_2')=\{Sw^r, g^r\}$ wherein the s is the digital signature of the attribute message M, w is $(g^c)^k$ in G, and r is the first random number;
the service provider device verifies S' as being an unlinkable signature-equivalent derived from S (the digital signature of the message M) by:
computing w as $(g^c)^k$ in G;

performing the bilinear mappings v1=e (H(M), $PK_{AP}$) where H(M) is a hash of the message M and $PK_{AP}$ is the public key of the attribute provider, v2=e (s2',g), and v=e (s1',g); and
verifying that v=v1*v2 which proves that s' is derived from s.

4. The method for operating an attribute assertion device to create a digital signature-equivalent of an assertion message M according to claim 2,
wherein the attribute assertion device computes w as H(k||c) wherein c is the challenge from the service provider device, the signature equivalent being the pair $S'=(s_1', s_2')=\{Sw^r, g^r\}$ wherein the s is the digital signature of the attribute message M, w is H(k||c), and r is the first random number;
the service provider device verifies S' as being an unlinkable signature-equivalent derived from S (the digital signature of the message M) by:
compute w as H(k||c) wherein c is the challenge from the service provider device;
performing the bilinear mappings v1=e (H(M), $PK_{AP}$) where H(M) is a hash of the message M and $PK_{AP}$ is the public key of the attribute provider, v2=e (s2',g), and v=e ($s_1'$,g); and
verifying that v=$v_1$*$v_2$ which proves that S' is derived from S.

5. The method for operating an attribute assertion device to create a digital signature-equivalent of an assertion message M according to claim 1, wherein the service provider device is a server.

6. The method for operating an attribute assertion device to create an unlinkable digital signature-equivalent of an assertion message according to claim 1, wherein the method comprising:
wherein the challenge received from the service provider is a challenge C, wherein C is $g^c$ in G, c being a random value in Zp, g being a group generator for the group G;
wherein the value w has the value w=$g^{kc}$ of the shared random number and the challenge provided by the service provider; and
on the service provider, verifying the unlinkable signature-equivalent S' using the challenge, the public key of the known attribute provider, and the shared secret is performed by:
computing a hash (H(M)) of the attribute message M,
computing $v_1$=e (H(M), $PK_{APi}$)
computing $v_2$=e (S2', w)
computing v=e ($S_1'$, g), and
verifying that v=v1*v2 as a proof that the attribute asserter device has knowledge of the signature S without revealing S.

7. The method for operating an attribute assertion device to create an unlinkable digital signature-equivalent of an assertion message according to claim 1, wherein the method comprising:
wherein the challenge received from the service provider is a challenge c in Zp;
wherein the value w has the value w=H(k||c) where H(k||c) is a hash of the shared random number k concatenated with the challenge C provided by the service provider; and
wherein on the service provider, verifying the unlinkable signature-equivalent s' using the challenge, the public key of the known attribute provider, and the shared secret is performed by:
computing a hash (H(M)) of the attribute message M,
computing $V_1$=e (H(M), $PK_{APi}$)
computing $v_2$=e ($s_2'$, w)
computing v=e ($s_1'$, g), and
verifying that v=$v_1$*$v_2$ as a proof that the attribute asserter device has knowledge of the signature S without revealing S.

8. An attribute assertion device having a processor, memory, and instruction storage, the instruction storage comprising instructions to cause the attribute assertion device processor to perform a method to create an unlinkable digital signature-equivalent of an assertion message that is verifiable, operating the processor of the attribute assertion device to transform a digital signature of the attribute message into an unlinkable digital signature-equivalent using a one-way transformation of the digital signature using a first random number generated by the attribute assertion device, and a challenge provided by the service provider device, the first random number held as a secret by the attribute assertion device, wherein the instructions comprise instructions to cause the processor to compute the unlinkable digital signature by:
generating a secret random number (r) and a shared random number (k) in Zp;
receiving a challenge from the service provider;
on each of the attribute assertion device and the service provider device, computing a value w that is a function of the shared random number and the challenge provided by the service provider;
generating the unlinkable signature-equivalent (S') that is a pairing of a first product ($S_1'$) and a second product ($S_2'$), wherein the first product ($S_1'$) is the product of the digital signature (S) and the value w to the power of the generated random number (r) ($S_1'$=$Sw^r$) and the second product ($S_2'$) is the generator g to the power of the generated random number (r) ($S_2'$=$g^r$); and
transmitting the unlinkable signature-equivalent S' and the shared random secret k to the service provider.

9. The attribute assertion device of claim 8 wherein the digital signature is in a group G having a generator g, the signature-equivalent is a pair wherein the first member of the pair computed from the first random number the challenge (c or $g^c$), and the digital signature, and the second member of the digital signature-equivalent pair is an exponentiation the group generator g to the power of the first random number.

10. The attribute assertion device of claim 8 wherein the challenge C is equal to $g^c$ in G, and
wherein the attribute assertion device computes w as ($g^c$) in G, the signature equivalent being the pair $S'=(s_1', s_2')=\{Sw^r, g^r\}$ wherein the s is the digital signature of the attribute message M, w is $(g^c)^k$ in G, and r is the first random number;
thereby enabling the service provider device to verify S' as being an unlinkable signature-equivalent derived from S (the digital signature of the message M) by:
computing w as $(g^c)^k$ in G;
performing the bilinear mappings v1=e (H(M), $PK_{AP}$) where H(M) is a hash of the message M and $PK_{AP}$ is the public key of the attribute provider, v2=e (s2',g), and v=e (s1',g); and
verifying that v=v1*v2 which proves that s' is derived from s.

11. The attribute assertion device of claim 8 wherein the attribute assertion device computes w as H(k||c) wherein c is the challenge from the service provider device, the signature equivalent being the pair S'=(si', s2)={$Sw^r$, g'} wherein the s is the digital signature of the attribute message M, w is H(k||c), and r is the first random number; thereby enabling the service provider to verify S' as being an unlinkable signature-equivalent derived from S (the digital signature of the message M) by: compute w as $H(k\|c)$ wherein c is the challenge from the service provider device; performing the bilinear mappings $v=e\ (H(M), PK_{AP})$ where $H(M)$ is a hash of the message M and $PK_{AP}$ is the public key of the attribute provider, $v2=e\ (s2', g)$, and $v=e\ (si',g)$; and verifying that $v=vi*v_2$ which proves that S' is derived from S.

12. The attribute assertion device of claim 8 the method performed by the attribute assertion device comprising:
wherein the challenge received from the service provider is a challenge C wherein C is $g^c$ in G, c being a random value in Zp, g being a group generator for the group G;
wherein the value w, also computed by the service provider device and has the value $w=g^{kc}$ of the shared random number and the challenge provided by the service provider; and
thereby enabling the service provider to verify the unlinkable signature-equivalent S' using the challenge, the public key of the known attribute provider, and the shared secret, by:
computing a hash (H(M)) of the attribute message M,
computing $v_1=e\ (H(M), PK_{APi})$
computing $v_2=e\ (S2', w)$
computing $v=e\ (S_1', g)$, and
verifying that $v=v1*v2$ as a proof that the attribute asserter device has knowledge of the signature S without revealing S.

13. The attribute assertion device of claim 8 the method performed by the attribute assertion device comprising:
wherein the challenge received from the service provider is a challenge c in Zp;
wherein the value w, which is also computed on the service provider device and has the value $w=H(k\|c)$ where $H(k\|c)$ is a hash of the shared random number k concatenated with the challenge provided by the service provider; and
thereby enabling the service provider to verify the unlinkable signature-equivalent s' using the challenge, the public key of the known attribute provider, and the shared secret, by:
computing a hash (H(M)) of the attribute message M,
computing $V_1=e\ (H(M), PK_{APi})$
computing $v_2=e\ (s_2', w)$
computing $v=e\ (s_1', g)$, and
verifying that $v=v_1*v_2$ as a proof that the attribute asserter device has knowledge of the signature S without revealing S.

14. A service provider device comprising:
a processor,
memory, and
instruction storage storing instructions to cause the service provider device processor to perform a method to verify an unlinkable digital signature-equivalent provided by an attribute assertion device receiving the unlinkable digital signature-equivalent on a service provider device having a processor and memory, as being generated from a digital signature of a known attribute provider having a public key $PK_{AP}$ wherein the unlinkable digital signature-equivalent is created by the attribute assertion device and verifiable by the service provider device without the sharing of a secret cryptographic key between the attribute assertion device and the service provider device, including instructions to cause the processor to provide a challenge to the attribute assertion device, and verify the unlinkable signature-equivalent using the challenge, the public key of the known attribute provider, and a shared secret received from the attribute assertion device; wherein the unlinkable signature-equivalent is produced by the attribute assertion device by generating on the attribute assertion device a first random number (k or $g^k$), computing a value w that is a function of the shared random number and the challenge provided by the service provider; generating the unlinkable signature-equivalent (S') that is a pairing of a first product ($S_1'$) and a second product ($S_2'$), wherein the first product ($S_1'$) is the product of the digital signature (S) and the value w to the power of the generated random number (r) ($S_1'=Sw^r$) and the second product ($S_2'$) is the generator g to the power of the generated random number (r) ($S_2'=g^r$).

15. The service provider device of claim 14, the instructions to cause the service provider device processor to perform a method comprising instruction to cause the processor to:
provide a challenge c to the attribute assertion device; and
wherein the verifying of the unlinkable signature-equivalent comprises using a bilinear map e to map the unlinkable signature-equivalent, a hash of the attribute message H(M) and known quantities including the public key of the attribute provider, the computed value w into quantities that may be compared to confirm that the unlinkable signature-equivalent proves that the attribute asserter knows the signature produced by the attribute provider.

16. The service provider device of claim 15 wherein the challenge C is equal to $g^c$ in G, and
wherein the attribute assertion device computes w as $(g^c)^k$ in G, the signature equivalent being the pair $S'=(s_1', s_2')=\{Sw^r, g^r\}$ wherein the s is the digital signature of the attribute message M, w is $(g^c)^k$ in G, and r is the first random number;
thereby enabling the service provider device to verify S' as being an unlinkable signature-equivalent derived from S (the digital signature of the message M) by:
computing w as $(g^c)^k$ in G;
performing the bilinear mappings $v1=e\ (H(M), PK_{AP})$ where H(M) is a hash of the message M and $PK_{AP}$ is the public key of the attribute provider, $v2=e\ (s2',g)$, and $v=e\ (s1',g)$; and
verifying that $v=v1*v2$ which proves that s' is derived from s.

17. The service provider device of claim 15 wherein the attribute assertion device computes w as $H(k\|c)$ wherein c is the challenge from the service provider device, the signature equivalent being the pair $S'=(s_1', s_2')=\{Sw^r, g^r\}$ wherein the s is the digital signature of the attribute message M, w is $H(k\|c)$, and r is the first random number;
thereby enabling the service provider to verify S' as being an unlinkable signature-equivalent derived from S (the digital signature of the message M) by:
compute w as $H(k\|c)$ wherein c is the challenge from the service provider device;
performing the bilinear mappings $v1=e\ (H(M), PK_{AP})$ where H(M) is a hash of the message M and $PK_{AP}$ is the public key of the attribute provider, $v2=e\ (s2',g)$, and $v=e\ (s_1',g)$; and
verifying that $v=v_1*v_2$ which proves that S' is derived from S.

\* \* \* \* \*